(12) United States Patent
Yanai

(10) Patent No.: US 7,407,292 B2
(45) Date of Patent: Aug. 5, 2008

(54) PROJECTOR AND POLARIZATION MEMBER USED IN PROJECTOR

(75) Inventor: Hiroaki Yanai, Shioziri (JP)

(73) Assignee: Seiko Epson Corporation, Tokyo (JP)

( * ) Notice: Subject to any disclaimer, the term of this patent is extended or adjusted under 35 U.S.C. 154(b) by 528 days.

(21) Appl. No.: 11/235,321

(22) Filed: Sep. 27, 2005

(65) Prior Publication Data

US 2006/0066812 A1    Mar. 30, 2006

(30) Foreign Application Priority Data

Sep. 28, 2004   (JP)   ............................. 2004-281116

(51) Int. Cl.
   *G02B 27/28* (2006.01)
   *G03B 21/14* (2006.01)
(52) U.S. Cl. ............................. 353/20; 353/81; 359/496
(58) Field of Classification Search .................. 353/20, 353/81; 359/495, 496, 497, 499
   See application file for complete search history.

(56) References Cited

U.S. PATENT DOCUMENTS 6,592,224 B2 * 7/2003 Ito et al. ....................... 353/20

FOREIGN PATENT DOCUMENTS

WO   WO 01/055778   8/2001

* cited by examiner

*Primary Examiner*—William C. Dowling
(74) *Attorney, Agent, or Firm*—Oliff & Berridge, PLC

(57) ABSTRACT

Aspects of the invention can provide a polarization member that can include a reflection type polarization element that transmits, of an incident light, a linear polarization component in a specific direction and reflects components other than the linear polarization component in the specific direction, and a return light splitting prism having a light incident surface on which the incident light goes incident, a light exiting surface disposed at a specific tilting angle with respect to the light incident surface, and a light discharge surface from which a return light that is reflected on the reflection type polarization element provided to the light exiting surface and enters inside by way of the light exiting surface, can be discharged in a direction that crosses neither an optical path of the incident light that goes incident on the light incident surface nor an optical path of a light that has passed through the reflection type polarization element. The light discharge surface can include a light transmission region surface, on which, of return lights entering inside by way of the light exiting surface, lights that have been reflected different numbers of times on one of the light incident surface and the light reflection type polarization element or on both, go incident at almost a same angle of incidence in opposite tilting directions to pass through.

45 Claims, 10 Drawing Sheets

F I G. 4
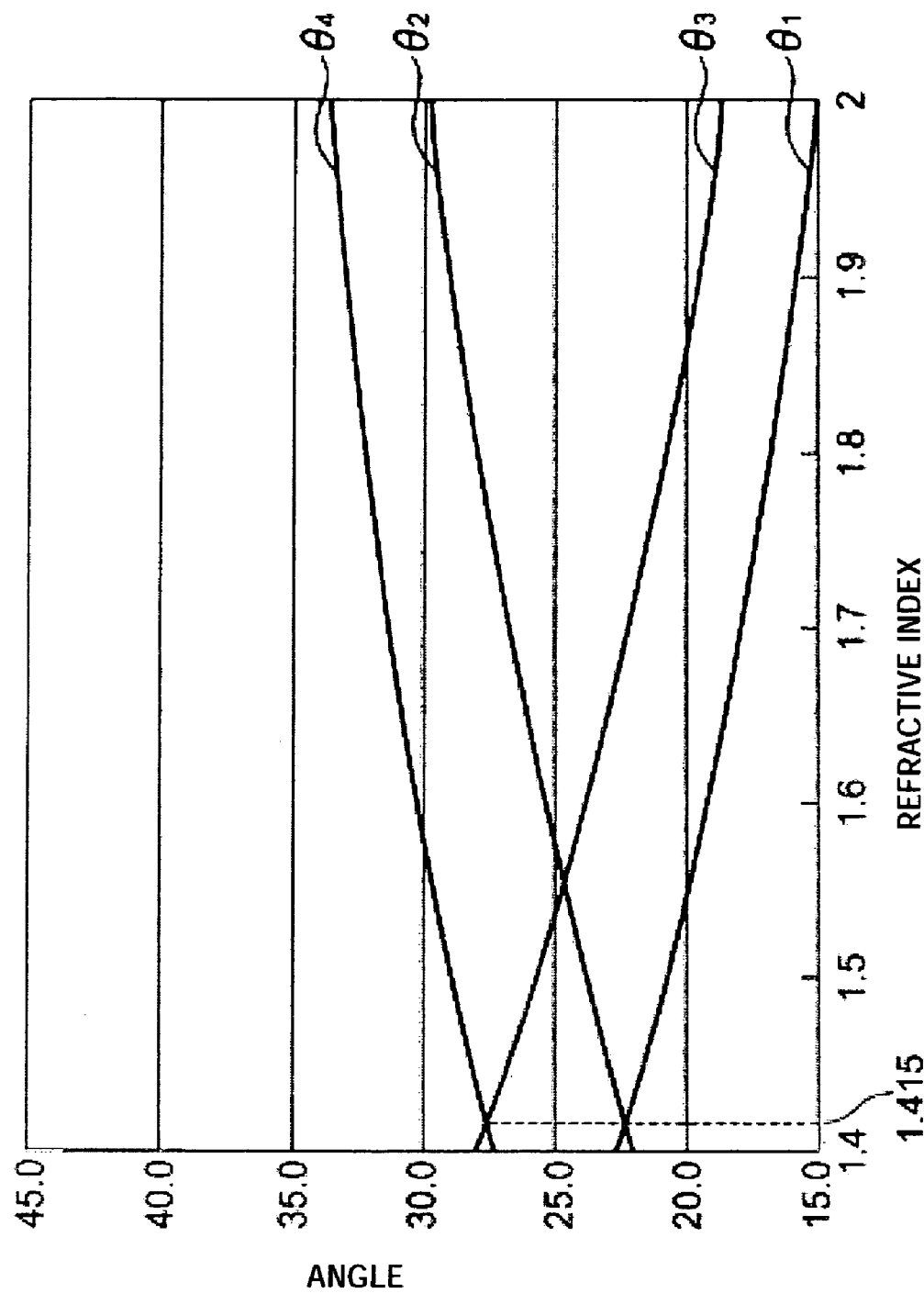

F I G. 9
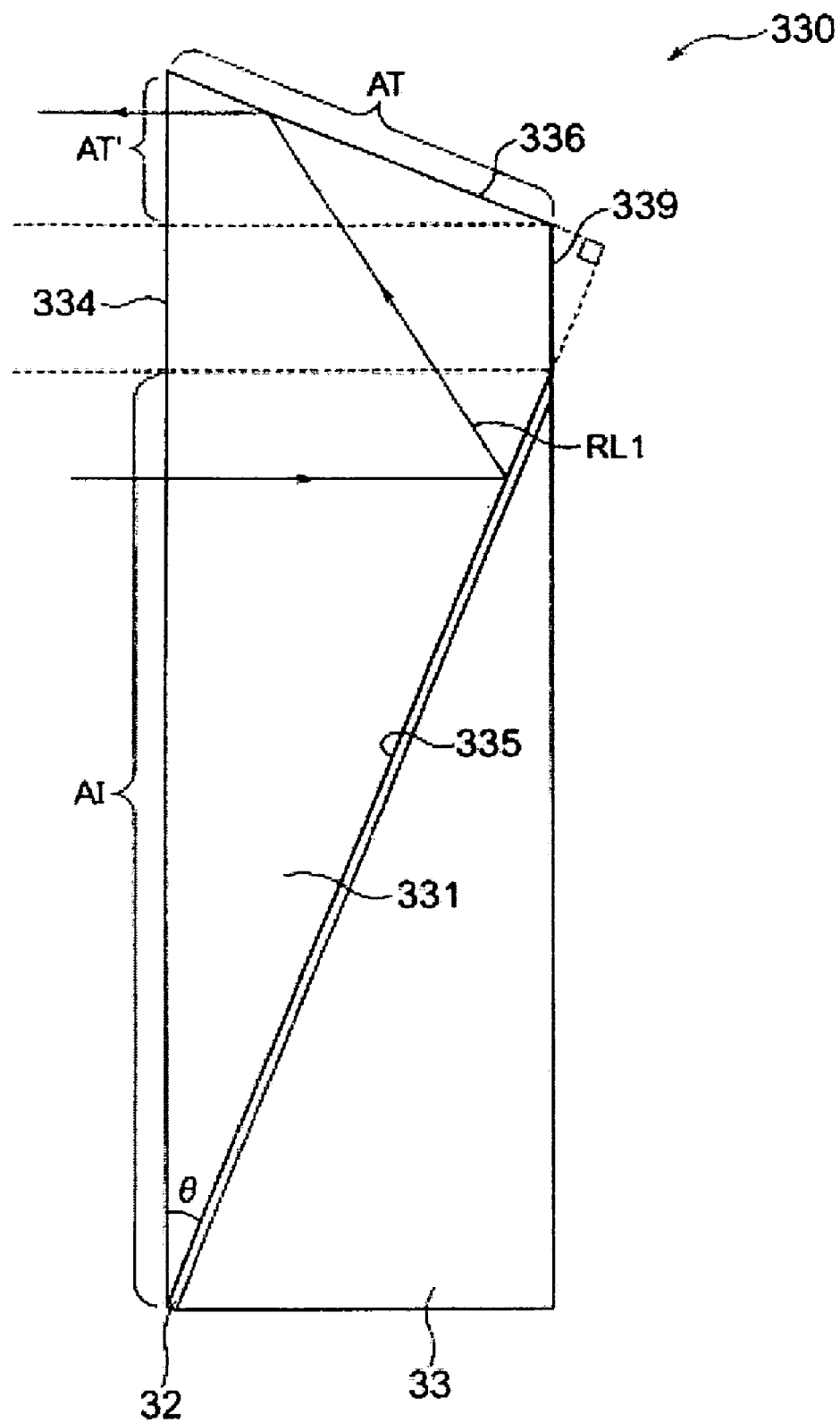

F.I.G. 10 (a)
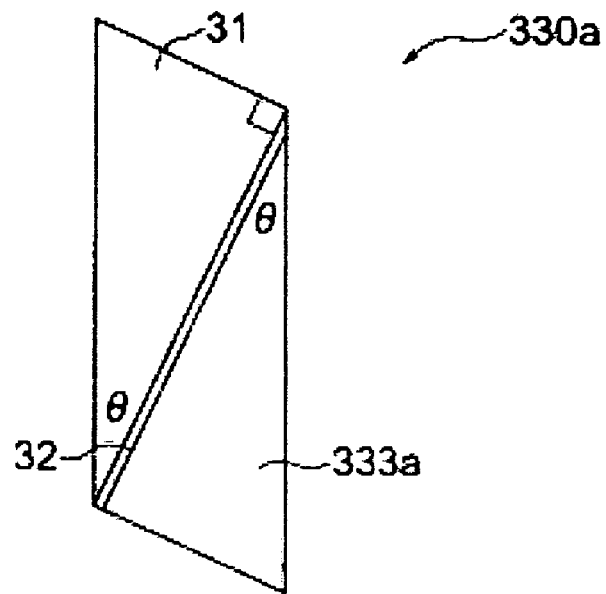
F.I.G. 10 (b)
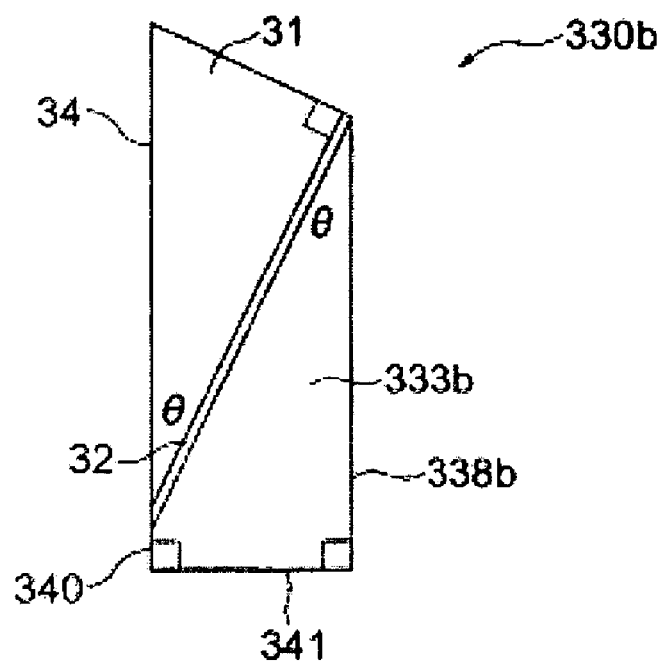

PROJECTOR AND POLARIZATION MEMBER USED IN PROJECTOR

BACKGROUND

Aspects of the invention can relate to a projector that projects an image and a polarization member used in a projector or the like due to its polarization adjustment function. In a related art projector of a type in which a liquid crystal light valve is incorporated, polarization elements can be normally disposed on the both sides of the light incident surface and the light exiting surface of a liquid crystal panel to adjust a polarization state. Light absorption type polarizers are often used as the polarization elements. The light absorption type polarizers, however, have a problem in that resistance to light and heat is poor and the life is short.

In order to solve this problem, resistance to light and heat of the polarization elements can be improved using light refection type polarizers, such as structured birefringent polarizers. See, for example, WO01 055778. In order to prevent reflected lights that are reflected on the reflection type polarizer disposed on the light exiting side, namely, unwanted lights, from returning to the light incident side, and thereby causing a malfunction, the above document also discloses a prism that satisfies a condition for the reflected lights from the polarizer to undergo total reflection on the light incident surface.

However, when lights are reflected twice or more inside the prism, the optical paths of reflected lights become more complicated. For example, it is necessary to consider multi-reflected lights, which are lights reflected on the polarizer on the light exiting side again after they undergo total reflection on the light incident surface of the prism. In this case, of incident lights entering into the prism via the incident surface, for example, for those entering at points far from a light discharge region, there is a possibility that multi-reflected lights are not discharged from the light discharge region, and eventually return toward the light incident surface. A countermeasure to avoid this inconvenience, however, raises another problem that an effective region for incident lights has to be made narrower with respect to the entire prism at the time of incidence.

SUMMARY

An aspect of the invention can provide a reflection type polarization member that is compact and yet has a wide effective region for incident lights due to its ability to process reflected lights each being reflected more than once inside the prism and thereby having a different optical path direction, and a projector that has a long life due to the use of the reflection type polarization member.

A polarization member according to a first aspect of the invention can include a reflection type polarization element that transmits, of an incident light, a linear polarization component in a specific direction and reflects components other than the linear polarization component in the specific direction, and a return light splitting prism having a light incident surface on which the incident light goes incident, a light exiting surface disposed at a specific tilting angle with respect to the light incident surface, and a light discharge surface from which a return light that is reflected on the reflection type polarization element provided to the light exiting surface and enters inside by way of the light exiting surface, is discharged in a direction that crosses neither an optical path of the incident light that goes incident on the light incident surface nor an optical path of a light that has passed through the reflection type polarization element. The light discharge surface can include a light transmission region surface, on which, of return lights entering inside by way of the light exiting surface, lights that have been reflected different numbers of times on one of the light incident surface and the light reflection type polarization element or on both, go incident at almost a same angle of incidence in opposite tilting directions to pass through.

An incident light that comes incident on the light incident surface of the polarization member exits from the light exiting surface. Polarization components other than the linearly polarized component in the specific direction can be reflected on the reflection type polarization element, and enter into the return light splitting prism in the form of return lights. The incident return lights can be reflected inside the prism different numbers of times that vary with the light incident positions, and therefore each has a different optical path. For example, there may possibly be a return light that returns to the light incident surface of the prism at which the light modulation device is present. However, the prism has the light incident surface on which the return lights returning to the light incident side undergo total reflection, and the light discharge surface including the light transmission region that transmits the return lights having undergone the total reflection to be discharged to the outside of the optical path. Moreover, these return lights go incident on the light discharge surface at almost the same angle of incidence in opposite tilting directions. It is thus possible to process the return lights having different optical path directions without returning these return lights to the optical paths of the incident lights from the light incident surface. In addition, by using the light reflection type polarization element as described above in an optical device, such as a projector, the life of the optical device, such as the projector, can be extended in comparison with a case where a light absorption type polarization element is used.

In other words, the polarization member further includes an optical path adjustment prism, disposed at a latter stage of an optical path of the reflection type polarization element, that adjusts all lights having passed through the reflection type polarization element to have equal optical path lengths in the polarization member. In this case, the optical path adjustment prism corrects a difference of the optical path lengths of lights having passed through the reflection type polarization element inside the return light splitting prism. It is thus possible to make the optical path lengths equal inside the polarization member.

In other words, the light transmission region surface of the light discharge surface of the return light splitting prism is perpendicular to the light exiting surface. In this case, of all the components of the return lights of lights that come incident perpendicularly to the light incident surface, the light discharge surface can be disposed in such a manner that plural components, having been reflected different numbers of times and thereby having different optical path directions, have almost the same angle of incidence in opposite tilting directions. In addition, a light that is reflected on the light exiting surface and directly goes incident on the light discharge surface is reflected on the light discharge surface and travels inversely through a path parallel to the path of the light traveled when it went incident on the incident surface, so that it is discharged to the outside.

Reflection of the return light on the light incident surface can be total reflection. In this case, the number of times of reflection depends on the light incident point of the incident light. Also, because the light undergoes total reflection, the reflected light will not be discharged from the light incident surface.

The return light splitting prism can have a refractive index of 1.415 or higher. In this case, total reflection readily occurs on the light incident surface.

The reflection type polarization element can be disposed to be parallel to the light exiting surface. In this case, when the reflected lights reflected on the reflection type polarization element go incident again on the return light splitting prism in the form of the return lights, the return lights are allowed to travel in the same direction optical path.

Both of the light incident surface and the light exiting surface of the return light splitting prism can be of rectangular shapes, and the specific tilting angle is set between short side directions of rectangles. In this case, it is possible to make the return light splitting prism thinner than in a case where the tilting angle is set between the long sides of the rectangles.

The reflection type polarization element selectively transmits a polarization component having transmissivity that increases relatively with a tilting direction of the light exiting surface. In this case, necessary lights are allowed to pass through the reflection type polarization element more effectively, which can in turn enhance the contrast.

The return light splitting prism can be provided with a total reflection surface formed by chamfering a ridge portion formed by the light discharge surface and the light exiting surface in the form of a plane parallel to the light incident surface. In this case, it is possible to control the optical paths of the reflected lights without having to thicken the return light splitting prism.

An exemplary projector according to a second aspect of the invention can include an illumination device that emits an illumination light, a light modulation device that modulates the illumination light from the illumination device, a polarization member, disposed at a latter stage of the light modulation device, that emits an image light by transmitting only a linearly polarized light in a specific direction of the modulation light modulated in the light modulation device, and a projection system that projects the image light formed in the light modulation device and the polarization member. The polarization member used herein can be the polarization member according to the first aspect of the invention.

The projector can thus achieve the same advantages as the polarization member according to the first aspect of the invention. In addition, by using the polarization member according to the first aspect of the invention that is provided with the light reflection type polarization element having characteristics as described above as the polarization member, not only can the life of the projector be extended in comparison with a case where a light absorption type polarization element is used, but also the occurrence of the return lights can be suppressed in a reliable manner while saving a space.

A projector according to a third exemplary aspect of the invention can include an illumination device that emits an illumination light, a light modulation device that modulates the illumination light from the illumination device, a polarization element, disposed at a former stage of the light modulation device, that emits only a linearly polarized light in a specific direction to the light modulation device, a polarization member, disposed at a latter stage of the light modulation device, that emits an image light by transmitting, of the modulation light modulated in the light modulation device, only a linearly polarized light in a direction orthogonal to the linearly polarized light in the specific direction, and a projection system that projects the image light formed in the polarization element, the light modulation device, and the polarization member. The polarization element used herein can be the polarization member according to the first aspect of the invention.

The projector can thus achieve the same advantages as the polarization member according to the first aspect of the invention. In addition, the polarization member is able to limit the polarization direction of illumination lights that come incident on the light modulation device to a specific direction. Moreover, the projector can extend the life by using the light reflection type polarization element in comparison with a case where a light absorption type polarization element is used.

A projector according to a fourth aspect of the invention can include an illumination device that emits an illumination light, a color separation system that separates the illumination light into color lights of specific wavelengths, plural light modulation devices that modulate respective color lights separated in the color separation system, plural polarization members, disposed, respectively, at a latter stage of optical paths of the plural light modulation devices, that emit image lights by transmitting only linearly polarized lights in a specific direction of the modulation lights modulated in the plural light modulation devices, a light combining system that combines the image lights of the respective colors formed in the plural light modulation devices and the plural polarization members, and a projection system that projects the image lights combined in the light combining system. At least one of the plural polarization members used herein is the polarization member according to the first aspect of the invention.

The projector can thus achieve the same advantages as the polarization member according to the first aspect of the invention. In addition, by using the light reflection type polarization element only at a necessary point for any of the respective color lights, not only is it possible to extend the life of the projector in comparison with a case where only light absorption type polarization elements are used, but it is also possible to suppress the occurrence of the return lights in a more reliable manner while saving a space. Moreover, in this case, the projector is able to project a color image.

A projector according to a fifth aspect of the invention can include an illumination device that emits an illumination light, a color separation system that separates the illumination light into color lights of specific wavelengths, plural light modulation devices that modulate respective color lights separated in the color separation system, and plural polarization elements, disposed, respectively, at a former stage of optical paths of the plural light modulation devices, that emit only linearly polarized lights in a specific direction to the plural light modulation devices. The invention can also include plural polarization members, disposed, respectively, at a latter stage of the optical paths of the plural light modulation devices, that emit image lights by transmitting, of the modulation lights modulated in the plural light modulation devices, only linearly polarized lights in a direction orthogonal to the linearly polarized lights in the specific direction, a light combining system that combines image lights of respective colors formed in the plural light modulation devices and the plural polarization members, and a projection system that projects the image lights combined in the light combining system. At least one of the plural polarization elements used herein can be the polarization member according to the first aspect of the invention.

The projector can thus achieve the same advantages as the polarization member according to the first aspect of the invention. In addition, each polarization member can be able to limit the polarization direction of illumination lights that come incident on the corresponding light modulation device to a specific direction. Further, by using the light reflection type polarization elements, the life of the projector can be extended in comparison with a case where the light absorption type polarization elements are used.

BRIEF DESCRIPTION OF THE DRAWINGS

The invention will be described with reference to the accompanying drawings, wherein like numbers reference like elements, and wherein:

FIG. 4 shows a graph used to describe respective conditions in the related art;

FIG. 9 is a view used to describe a return light splitting prism of fourth exemplary embodiment;

FIG. 10A and FIG. 10B are views used to describe optical path adjustment prisms as modifications of the counterparts in first to fourth exemplary embodiments.

DETAILED DESCRIPTION OF EMBODIMENTS

Figure 1:
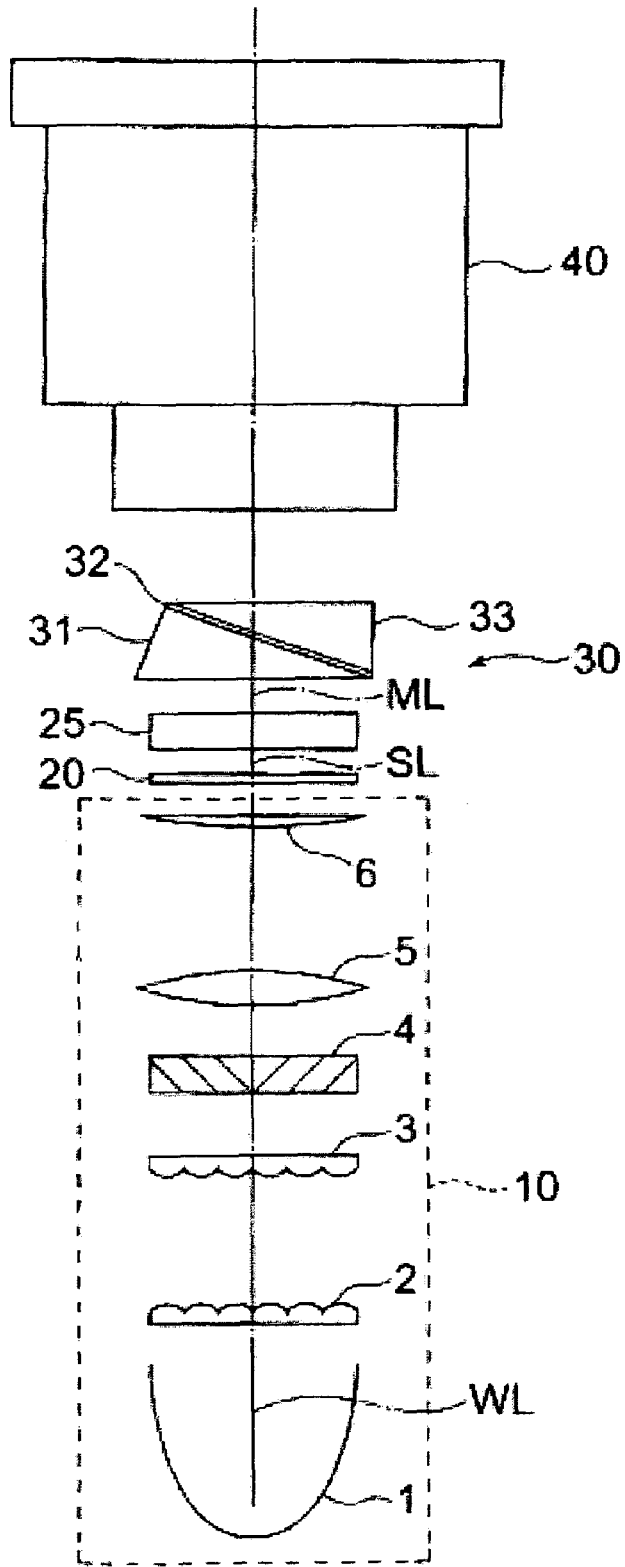
FIG. 1 is a view used to describe a projector according to a first exemplary embodiment.

FIG. 1 is a view used to describe a projector 50 according to a first exemplary embodiment. The projector 50 of this exemplary embodiment can include an illumination device 10 that forms illumination lights, a polarizer 20 that increases a degree of polarization, a liquid crystal panel 25 serving as a light modulation device that forms modulation lights, a polarization member 30 that forms an image light using modulation lights, and a projection lens 40 serving as a projection system. Optical elements forming the illumination device 10, the polarizer 20, the liquid crystal panel 25, the polarization member 30, and the projection lens 40 are positioned in reference to a specific illumination optical axis.

The illumination device 10 can include a light source 1, lens arrays 2 and 3, a polarization conversion element array 4, a superimposing lens 5, and a field lens 6.

The light source 1 can include a light source lamp and a reflector that emits light source lights WL by aligning lights emitted from the light source lamp in a specific direction. The central axis of the light source lights WL is in agreement with the illumination optical axis. Herein, a high pressure mercury-vapor lamp is adopted as the light source lamp. However, a metal halide lamp or a halogen lamp can be adopted as well. Also, a paraboloidal mirror is adopted as the reflector herein. However, another configuration can be adopted as well, in which a parallelizing concave lens is provided to the light exiting surface of a reflector comprising an ellipsoidal mirror.

The lens array 2 can include plural small lenses arrayed within a plane orthogonal to the illumination optical axis. The contour shape of each small lens in the lens array 2 is set so that it is almost the similar figure to an image forming region of the liquid crystal panel 25. For example, given 4:3 as an aspect ratio (a ratio of the width dimension to the height dimension) of the image forming region of the liquid crystal panel 25, then the aspect ratio of each small lens is also set to 4:3.

The lens array 3 is of substantially the same configuration as the lens array 2, and therefore includes small lenses arrayed within a plane orthogonal to the illumination optical axis.

The polarization conversion element array 4 is of a configuration in which polarization separation layers and reflection layers tilted with respect to the illumination optical axis are arrayed alternately.

The polarizer 20 is of a configuration in which a polarization layer is provided to a substrate made of sapphire glass or the like.

The liquid crystal panel 25 can use for example, polysilicon TFTs as switching elements. Although it is not shown in the drawing, it can include a panel main body formed by hermetically sealing liquid crystal in a space between a pair of oppositely placed light transmissive substrates, and a holding frame accommodating the panel main body.

Although it will be described in detail below, the polarization member 30 can include a return light splitting prism 31, a reflection type polarization element 32, and an optical path adjustment prism 33.

The projection lens 40 includes a set lens in which plural lenses are accommodated in a cylindrical case.

The projector 50 of this exemplary embodiment will now be described by following the image forming steps. The light source 1 emits light source lights WL by aligning lights emitted from the light source lamp in a specific direction. The lens array 2 divides light source light WL emitted from the light source 1 into partial lights.

The lens array 3 together with the superimposing lens 5 can superimpose all the partial lights divided in the lens array 2 on an image forming region of the liquid crystal panel 25, and makes the distribution of a light quantity of the illumination lights homogeneous across the image forming region of the liquid crystal panel 25.

The polarization conversion element array 4 converts polarization directions of the respective partial lights from the lens array 3 to form linearly polarized lights of one kind. The partial lights that have been converted to linearly polarized lights of one kind in the polarization conversion element array 4 are superimposed on the image forming region of the liquid crystal panel 25 by means of the superimposing lens 5.

The field lens 6 adjusts an angle of incidence of illumination lights SL with respect to the polarizer 20 by converting partial lights exiting from the lens array 3 into lights almost parallel to the illumination optical axis, so that the partial lights are emitted in the form of the illumination lights SL from the illumination device 10 to the polarizer 20.

Of the illumination lights SL coming incident on the polarizer 20, the polarizer 20 transmits only linearly polarized lights in a specific direction to be modulated in the liquid crystal panel 25 and absorbs lights other than the linearly polarized lights in this specific direction. Hence, the polarization direction is limited to a narrower range and the illumination lights SL go incident on the liquid crystal panel 25 at a higher degree of polarization.

The liquid crystal panel 25 forms modulation lights ML by modulating the illumination lights SL according to image information. Of the modulation lights ML thus formed, the polarization member 30 transmits only linearly polarized lights in a specific direction. The direction of the linearly polarized lights allowed to pass through the polarizer 20 and the direction of the linearly polarized lights allowed to pass through the polarization member 30 are set to be orthogonal to each other. The modulation lights ML modulated in the liquid crystal panel 25 first go incident on the return light splitting prism 31 of the polarization member 30 disposed on the latter stage in an optical path of the liquid crystal panel 25. The modulation lights ML having passed through the return light splitting prism 31 then go incident on the reflection type polarization element 32. Of the polarization components of the incident modulation lights ML, linear polarization components in a specific direction (for example, polarized lights perpendicular to the surface of the sheet), which are the necessary lights, pass through the reflection type polarization element 32. Subsequently, the optical path adjustment prism 33 adjusts all the lights passing through the polarization member 30 to have equal optical path lengths.

Meanwhile, of the polarization components of the incident modulation lights ML, lights other than the linear polarization components in the specific direction, which are unwanted lights, can be reflected on the reflection type polarization element 32, and reflected lights from the reflection type polarization element 32 go incident again on the return light splitting prism 31 in the form of return lights RL. A mechanism in the return light splitting prism 31 causes the return lights RL that have come incident again to be discharged to the outside of the optical paths of the modulation lights ML without returning toward the liquid crystal panel 25 (this will be described in detail below). Because the projector 50 of this exemplary embodiment uses the reflection type polarization element 32, a heat value is lower and the life is therefore longer than in a case where a light absorption type polarization element is used.

Finally, the projection lens 40 projects an optical image formed by the polarizer 20, the liquid crystal panel 25, and the polarization member 30 onto a screen or the like in the form of a projection light at a desired scale of enlargement.

In this exemplary embodiment, the polarization member 30 having the reflection type polarization element 32 is provided at the latter stage of the liquid crystal panel 25; however, the same polarization member using a reflection type polarization element can be disposed at the former stage of the liquid crystal panel 25. In this case, by replacing the polarizer 20 with a polarization member having the same configuration as the polarization member 30 and using a reflection type polarization element that transmits linearly polarized lights in a direction orthogonal to the direction of linearly polarized lights allowed to pass through the polarization member 30, the direction of linearly polarized lights to be modulated in the liquid crystal panel 25 is also limited to a narrower range in the same manner as the polarizer 20. Hence, not only is it possible to increase a degree of polarization, but it is also possible to improve durability.

Figure 2:
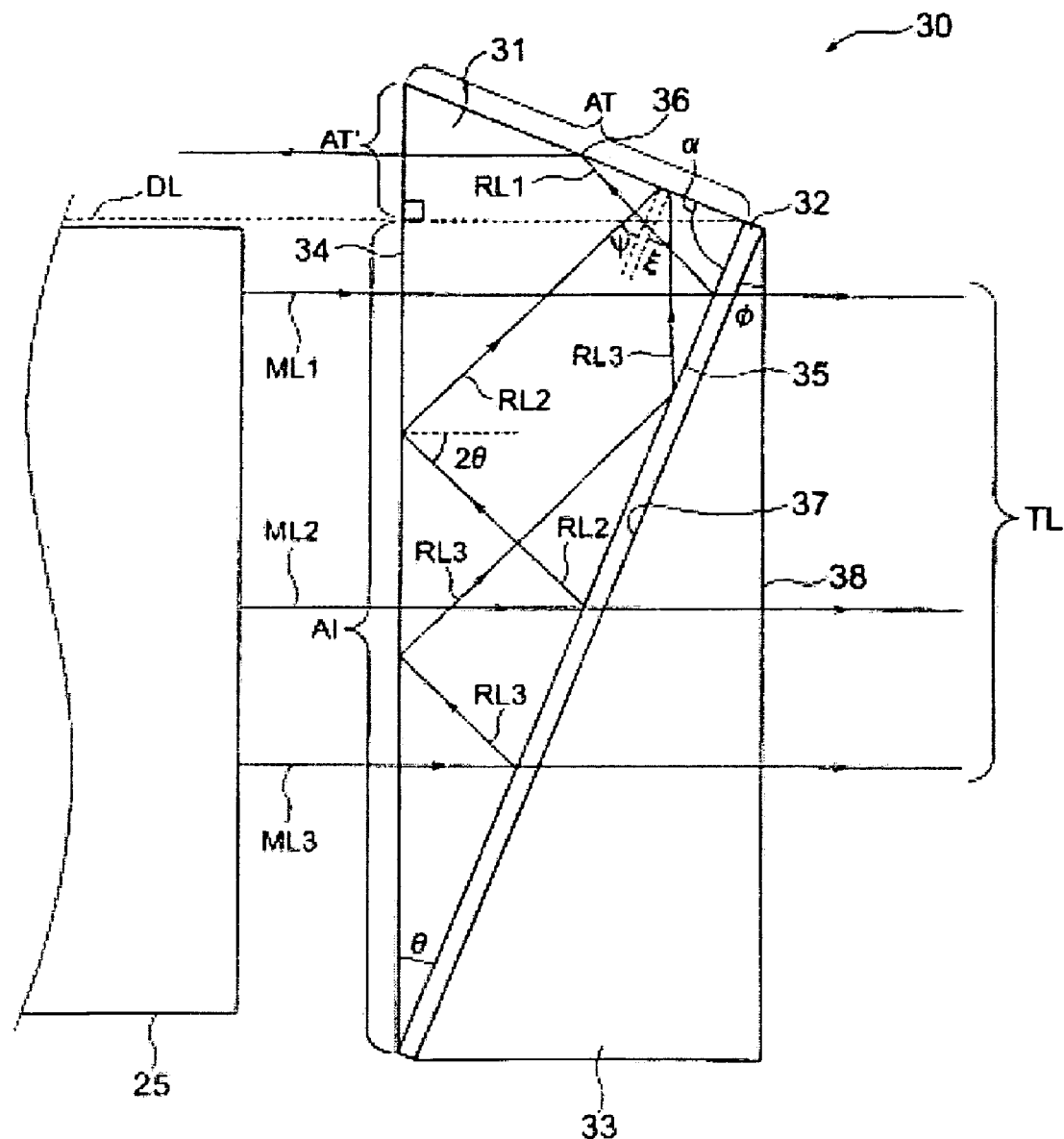
FIG. 2 is a view used to describe a polarization member employed in projectors of first and second exemplary embodiments.

FIG. 2 is a view used to describe the polarization member 30 used in the projector 50 of FIG. 1. As has been described, the polarization member 30 includes the return light splitting prism 31, the reflection type polarization element 32, and the optical path adjustment prism 33.

The return light splitting prism 31 is a triangular prism, and has a light incident surface 34 opposing the liquid crystal panel 25 and including a light incident region AI on which the modulation lights ML from the liquid crystal panel 25 go incident almost perpendicularly, a light exiting surface 35 disposed at an apex angle θ, which is a specific tilting angle, with respect to the light incident surface 34, and a light discharge surface 36 including a light transmission region AT from which the return lights RL entering inside by way of the light exiting surface 35 are discharged to the outside of the optical paths of the modulation lights ML. These three surfaces form the side surfaces of the return light splitting prism 31. Also, assume that an angle produced between the light exiting surface 35 and the light discharge surface 36 is the basic angle α, and in particular, 90° is given as the basic angle α in this exemplary embodiment. In short, the light discharge surface 36 is perpendicular to the light exiting surface 35. Also, a region on the light incident surface 34 other than the light incident region AI used to discharge the return lights RL is referred to as a light transmission region AT'.

The reflection type polarization element 32 is disposed in parallel with the light exiting surface 35 of the return light splitting prism 31. In particular, in this exemplary embodiment, the reflection type polarization element 32, formed by providing a reflection type polarization layer to a light transmissive plate made of sapphire or the like, is laminated to the light exiting surface 35 of the return light splitting prism 31.

The optical path adjustment prism 33 has a light incident surface 37 on which transmission lights TL having passed through the reflection type polarization element 32 go incident, and a light exiting surface 38 from which the transmission lights TL having passed through the optical path adjustment prism 33 exit. It is configured in such a manner that the light incident surface 37 is parallel to the reflection type polarization element 32 and the light exiting surface 38 is parallel to the light incident surface 34 of the return light splitting prism 31. In particular, in this exemplary embodiment, the light incident surface 37 of the optical path adjustment prism 33 is laminated to the reflection type polarization element 32.

The optical path adjustment prism 33 has the same refractive index as a refractive index n of the return light splitting prism 31, and an angle φ produced between the light incident surface 37 and the light exiting surface 38 is equal to the apex angle θ. Due to the optical path adjustment prism 33, all the lights that come incident on the light incident surface 34 of the return light splitting prism 31 and exit from the light exiting surface 38 of the optical path adjustment prism 33 can be aligned to have equal optical path lengths inside the polarization member 30. Further, because the light exiting surface 38 is parallel to the light incident surface 34 of the return light splitting prism 31, linear polarization components, which are necessary lights, entering inside via the light incident surface 34 of the return light splitting prism 31, are allowed to exit without being refracted in the optical path adjustment prism 33.

In addition, when the refractive index of the optical path adjustment prism 33 is different from the refractive index n of the return light splitting prism 31, the optical path lengths of the transmission lights TL can be made equal by appropriately adjusting the angle φ.

In this exemplary embodiment, the reflection type polarization element 32 is formed by providing the reflection type polarization layer on a light transmissive plate made of sapphire or the like. Also, the light exiting surface 35 of the return light splitting prism 31 and the light incident surface 37 of the optical path adjustment prism 33 are laminated, respectively, onto the light incident surface and the light exiting surface of the reflection type polarization element 32. However, it may be configured in such a manner that the reflection type polarization layer is deposited directly onto either the light exiting surface 35 of the return light splitting prism 31 or the light incident surface 37 of the optical path adjustment prism 33, or a polarization sheet is laminated directly to either the surface 35 or 37, and the other surface is bonded to the polarization layer/polarization sheet.

A characteristic of an image light forming method in this exemplary embodiment will now be described by chiefly following the return lights RL, which are reflected lights on the reflection type polarization element 32, through optical paths of the modulation lights ML that vary with light incident positions on the light incident region AI. In particular, the processing of the return lights RL needs to be considered in this exemplary embodiment. In other words, it is important to prohibit the return lights RL, which are unwanted lights, from returning to the image forming region of the liquid crystal panel 25.

Referring to FIG. 2, given that a splitting surface DL is a plane perpendicular to the light incident surface 34 including the ridge between the light exiting surface 35 and the light discharge surface 36 producing the basic angle α of the return light splitting prism 31. The splitting surface DL splits the light incident surface 34 into the light incident region AI on which the modulation lights ML from the liquid crystal panel 25 come incident almost perpendicularly, and the light transmission region AT', which is one of regions used to discharge the return lights RL. The liquid crystal panel 25 is therefore located below the splitting surface DL in FIG. 2. In other words, in a case where the return lights RL are discharged from the light transmission region AT', they are directed in a direction that will not cross the splitting surface DL, and therefore can be processed without giving influences to the liquid crystal panel 25. In other words, the return lights RL are discharged in a direction parallel to or to the upper side of the splitting surface DL in FIG. 2, that is, in a direction moving away from the liquid crystal panel 25, from the light transmission region AT', and guided to the outside of the optical system.

Assume that the modulation lights ML are emitted from the liquid crystal panel 25 and go incident on the light incident surface 34 perpendicularly. The modulation lights ML are referred to as modulation lights ML1, ML2, and ML3 on the side closer to the basic angle α. More specifically, referring to FIG. 2, the modulation light ML1 is located on the upper side of the light incident region AI, the modulation light ML2 is located near the center of the light incident region AI, and the modulation light ML3 is located on the lower side of the light incident region AI.

The modulation light ML1 coming incident on the light incident surface 34 exits from the light exiting surface 35. A linear polarization component, which is a necessary light, then passes through the reflection type polarization element 32. Subsequently, the optical path adjustment prism 33 adjusts the optical path length of a transmission light TL obtained in this manner. Meanwhile, of the polarization components of the incident modulation light ML1, a component of an unwanted light is reflected on the reflection type polarization element 32, and returns to the inside of the return light splitting prism 31 in the form of a return light RL1. The return light RL1 is reflected on the light transmission region surface AT of the light discharge surface 36. Because the basic angle α is 90°, the return light RL1 reflected on the light transmission region surface AT becomes parallel to the modulation light ML1 given as the incident light, in other words, it becomes parallel to the splitting surface DL. Hence, the return light RL1 is discharged from the light transmission region AT' without returning to the liquid crystal panel 25, and processed so that it goes incident on an absorber or in any other appropriate manner.

The modulation light ML2 coming incident on the light incident surface 34 exits from the light exiting surface 35. A linear polarization component, which is a necessary light, then passes through the reflection type polarization element 32. Subsequently, the optical path adjustment prism 33 adjusts the optical path length of a transmission light TL thus obtained. Meanwhile, of the polarization components of the incident modulation light ML2, a component of an unwanted light is reflected on the reflection type polarization element 32, and returns to the inside of the return light splitting prism 31 in the form of a return light RL2. The return light splitting prism 31 is configured in such a manner that the return light RL2 undergoes total reflection on the light incident surface 34, so that the return light RL2 will not return to the liquid crystal panel 25. In this instance, an angle of incidence of the return light RL2 with respect to the light incident surface 34 is 2θ. Hence, as the condition of total reflection, the return light splitting prism 31 satisfies Condition (1) as to the apex angle θ and the refractive index n as follows:

$$\theta \geq \frac{1}{2}\sin^{-1}\frac{1}{n} \quad (1)$$

That is to say, in order to make the apex angle θ smaller, it is necessary to use a substance having a larger refractive index n as the return light splitting prism 31. When Condition (1) is satisfied, the return light RL2 undergoes total reflection on the light incident surface 34. The return light RL2 having undergone total reflection goes incident on the light transmission region surface AT of the light discharge surface 36. An angle of incidence, ψ, of the return light RL2 with respect to the light discharge surface 36 in this instance is (180°−α)−3θ. In particular, because α=90° is given in this exemplary embodiment, we obtain ψ=90°−3θ. The return light splitting prism 31 is configured so as not to allow the return light RL2 to undergo total reflection on the light discharge surface 36. Because when the return light RL2 undergoes total reflection on the light discharge surface 36, the reflected return light RL2 becomes a stray light inside the return light splitting prism 31, and possibly returns to the liquid crystal panel 25. Hence, in order to prevent total reflection, the angle of incidence, ψ, satisfies the condition as follows:

$$\psi \leq \sin^{-1}\frac{1}{n}$$

Because ψ=90°−3θ is given, this condition takes the same value as the inequality as follows:

$$\theta \geq 30° - 1/3 \sin^{-1}\frac{1}{n} \quad (2)$$

This inequality is referred to as Condition (2). Under the conditions where these Condition (1) and Condition (2) are satisfied, the return light RL2 is discharged without returning to the liquid crystal panel 25, and processed so that it goes incident on the absorber or in any other appropriate manner.

The modulation light ML3 coming incident on the light incident surface 34 exits from the light exiting surface 35. A linear polarization component, which is a necessary light, then passes through the reflection type polarization element 32. Subsequently, the optical path adjustment prism 33 adjusts the optical path length of a transmission light TL thus obtained. Meanwhile, of the polarization components of the incident modulation light ML3, a component of an unwanted light is reflected on the reflection type polarization element 32, and returns to the inside of the return light splitting prism 31 in the form of a return light RL3. Because the modulation light ML2 and the modulation light ML3 go incident on the reflection type polarization element 32 at the same angle, both the return light RL2 and the return light RL3, which are reflected on the reflection type polarization element 32 and enter into the light splitting prism 31, go incident on the light incident surface 34 at the same angle. Hence, in the return light splitting prism 31 that satisfies Condition (1) under which the return light RL2 undergoes total reflection as described above, the return light RL3 that comes incident on the light incident surface 34 will not return toward the liquid crystal panel 25, and as with the return light RL2, it undergoes total reflection on the light incident surface 34. Further, the return light RL3 having undergone total reflection on the light incident surface 34 exits again from the light exiting surface 35 of the return light splitting prism 31, and is then reflected on the reflection type polarization element 32. The return light RL3, having been reflected on the reflection type polarization element 32 and returned again to the return light splitting prism 31, goes incident on the light transmission region surface AT of the light discharge surface 36. The angle of incidence, ξ, with respect to the light discharge surface 36 in this instance is α−3θ. In particular, because α=90° is given in this exemplary embodiment, we obtain ξ=90°−3θ. As with the case of the return light RL2, the return light splitting prism 31 is configured so as not to allow the return light RL3 to undergo total reflection on the light discharge surface 36. The angle of incidence, ψ, and the angle of incidence, ξ, are found to be ψ=(180°−α)−3θ and ξ=α−3θ, respectively. Because 90° is given as the basic angle α in this exemplary embodiment, the angle of incidence, ψ, and the angle of incidence, ξ, are found, respectively, to be ψ=(90°)−3θ and ξ=90°−3θ, that is, ψ=ξ. Hence, in the return light splitting prism 31 satisfying Condition (2) under which the return light RL2 is not allowed to undergo total reflection as has been described, the return light RL3 coming incident on the light discharge surface 36 exits from the light discharge surface 36 without undergoing total reflection.

When the basic angle α is set to an angle other than 90°, one of the return light RL2 and the return light RL3 has a smaller angle of incidence with respect to the light discharge surface 36 while the other has a larger angle of incidence. When the angle of incidence is increased, a light undergoes total reflection more readily. Hence, the optimum condition is to set the basic angle α to 90°, and in a practical use, it is preferable to set the basic angle α to 90° or nearly 90°.

Hence, with the use of the return light splitting prism 31 satisfying Conditions (1) and (2), the return light RL3 is discharged from the light discharge surface 36 without returning to the liquid crystal panel 25, and is processed so that it goes incident on the absorber or in any other appropriate manner.

By taking into account the conditions under which the return lights RL2 and RL3, having been reflected on the reflection type polarization element 32 and returned to the return light splitting prism 31, undergo total reflection on the light incident surface 34, and further, by setting the basic angle α suitably to 90° or nearly 90°, it is possible to discharge reflected lights reflected on the reflection type polarization element 32, that is, unwanted light components, from the light transmission region surface AT of the light discharge surface 36 while the return light RL2 and RL3 are tilted with respect to the light discharge surface 36 in opposite directions at almost the same angle of incidence. It is thus possible to discharge unwanted light components having different optical path directions to the outside of the optical paths of the modulation lights ML without returning the unwanted light components to the liquid crystal panel 25, so that they are processed to go incident on the absorber or in any other appropriate manner.

The value of the apex angle θ determines the number of times of total reflection of the return lights RL inside the return light splitting prism 31. For example, when the apex angle θ is smaller than 22.5°, there is a possibility that the return lights undergo total reflection once or more than once again inside the return light splitting prism 31. However, the same descriptions can be applied in this case, too.

Figure 3:
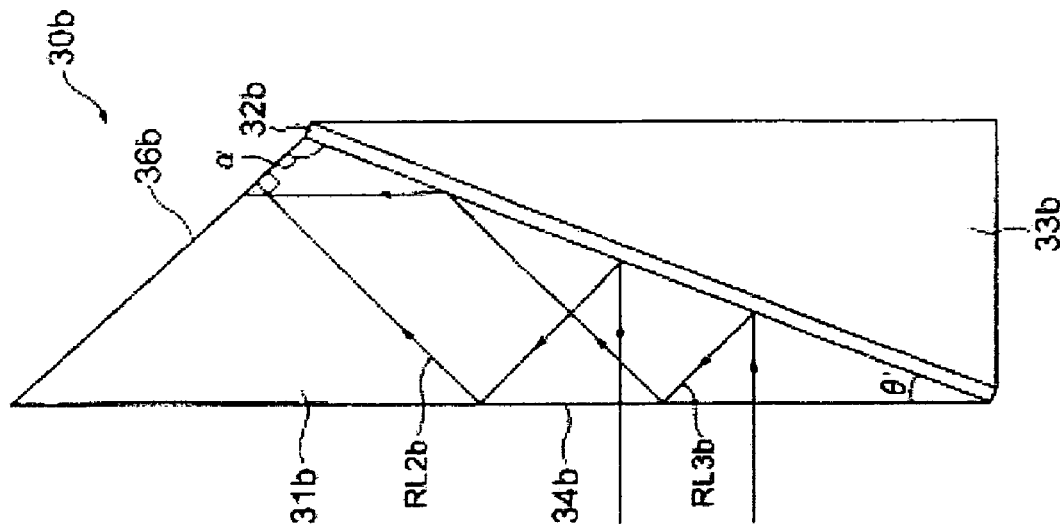
FIG. 3A and FIG. 3B are views used to describe a polarization member in the related art.
Figure 3:
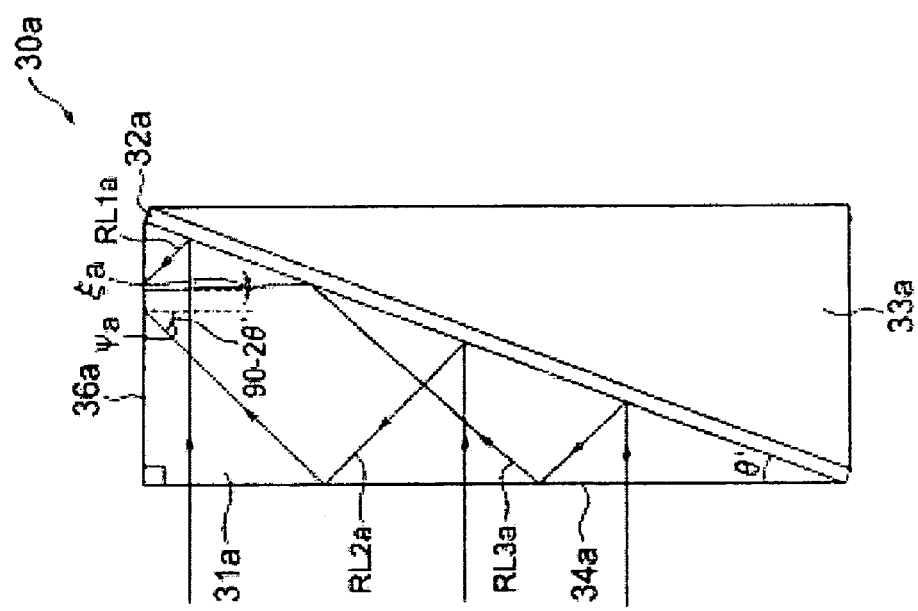

FIG. 3A and FIG. 3B show examples of the polarization member in the related art. Polarization members 30a and 30b include, respectively, return light splitting prisms 31a and 31b, reflection type polarization elements 32a and 32b, and optical path adjustment prisms 33a and 33b. Because other than the shapes of the return light splitting prisms 31a and 31b, the configurations are the same as the counterparts of this exemplary embodiment, descriptions of the same components are omitted.

Referring to FIG. 3A, the return light splitting prism 31a has a light incident surface 34a and a light discharge surface 36a that produce a right angle. In this case, for the return lights RL2a and RL3a, having been reflected on the reflection type polarization element 32a and returned to the return light splitting prism 31a, to undergo total reflection on the light incident surface 34a, as with this exemplary embodiment, the return light splitting prism 31a needs to satisfy a condition as to the apex angle θ' and the refractive index n' of the return light splitting prism 31a as follows:

$$\theta \geq \frac{1}{2}\sin^{-1}\frac{1}{n}$$

Further, the return light RL3a goes incident on the light discharge surface 36a at an angle of incidence, ξa, and is reflected on the reflection type polarization element 32a, thereby returning to the return light splitting prism 31a. The return light RL1a that goes incident directly on the light discharge surface 36a and the return light RL2a go incident on the light discharge surface 36a at almost the same angle of incidence, ψa, in the opposite tilting directions with respect to the normal to the light discharge surface 36a.

With the return light splitting prism 31a having the light incident surface 34a and the light discharge surface 36a that produce a right angle, the angle of incident, ξa, of the return light RL3a with respect to the light discharge surface 36a is found to be ξa=90°−4θ', and the angle of incidence, ψa, of the return lights RL1a and RL2a with respect to the light discharge surface 36a is found to be ψa=90°−2θ'. Hence, the angle of incidence, ψa, of the return lights RL1a and RL2a with respect to the light discharge surface 36a becomes larger than the angle of incidence, ξa, of the return light RL3a with respect to the light discharge surface 36a. The return lights RL1a and RL2a therefore undergo total reflection on the light discharge surface 36a more readily than the return light RL3a. In a case where the return light RL1a is reflected on the light discharge surface 36a, the return light RL1a having been reflected on the light discharge surface 36a exits from the polarization member 30a toward the liquid crystal panel. In a case where the return light RL2a is reflected on the light discharge surface 36a, it is reflected on the reflection type polarization element 32a and exits from the polarization member 30a toward the liquid crystal panel.

FIG. 4 shows a graph related to Conditions (1)' and (2)' specified below as to the return lights RL1a and RL2a in the return light splitting prism 31 a shown in FIG. 3A. The abscissa is used for the refractive index n' of the return light splitting prism 31a, and the ordinate is used for the apex angle θ'. In this case, Condition (1)' under which the return lights RL1a and RL2a are allowed to undergo total reflection on the light incident surface 34a is as follows:

$$\theta' \geq 1/2 \sin^{-1} \frac{1}{n'} \quad (1)'$$

The right side of the inequality, $\theta_1$, is indicated on the graph of FIG. 4. Also, because the angle of incidence, ψa, of the return lights RL1a and RL2a with respect to the light discharge surface 36a is given as ψa=90°−2θ', Condition (2)' under which the return lights RL1a and RL2a are not allowed to undergo total reflection on the light discharge surface 36a is as follows:

$$\theta' \geq 45° - 1/2 \sin^{-1} \frac{1}{n'} \quad (2)'$$

The right side of the inequality, $\theta_2$, is indicated on the graph of FIG. 4. In short, the condition that the apex angle θ' should satisfy on the graph is as follows: θ'≧$\theta_1$ and θ'≧$\theta_2$. Hence, as can be understood from the graph, when the refractive index n' is smaller than 1.415, the value of $\theta_1$ found in accordance with Condition (1)' is larger than the value of $\theta_2$ found in accordance with Condition (2)'. The apex angle θ' therefore needs to satisfy Condition (1)' alone. Conversely, when the refractive index n' is equal to or larger than 1.415, the value of $\theta_2$ found in accordance with Condition (2)' is larger than the value of $\theta_1$ found in accordance with Condition (1)'. The apex angle θ' therefore needs to satisfy Condition (2)'.

However, when the refractive index n' of the return light splitting prism 31a is smaller than 1.415, because Condition (1)' is more strict than Condition (2)', it is sufficient to satisfy Condition (1)' alone. However, materials are limited to a large extent when a prism having a refractive index of about 1.415 or smaller than 1.415 is manufactured in practice. In addition, when the refractive index of the prism is small, because the return lights RL2a and RL3a hardly undergo total reflection on the light incident surface 34a, the apex angle θ' needs to be increased to some extent to satisfy Condition (1)'. On the other hand, when the prism has a large refractive index, because the return lights RL1a and RL2a undergo total reflection more readily on the light discharge surface 36a, the apex angle θ' needs to be increased to satisfy Condition (2)'.

To be more specific, when the apex angle θ' is made smaller, the polarization member 30a is no longer able to satisfy one of Condition (1)' and Condition (2)'. Alternatively, Condition (2)' may be re-written to find $\theta_2$ using the angle of incidence, ξa, as a condition under which the return light RL3a is not allowed to undergo total reflection on the light discharge surface 36a. Then, the value of $\theta_2$ can be smaller than the one found using the angle of incidence, ψa, of the return lights RL1a and RL2a, which can in turn make the apex angle θ' smaller. However, in order to prohibit the return lights RL from exiting from the polarization member 30a toward the liquid crystal panel, it is necessary to limit the region on which modulation lights from the liquid crystal panel go incident in such a manner that unwanted lights of the modulation lights from the liquid crystal panel do not follow the optical paths of the return lights RL1a and RL2a. This consequently raises the need to thicken the polarization member 30a to secure the light incident region of the modulation lights from the liquid crystal panel.

A polarization member 30b as is shown in FIG. 3B is used as a method by which the return light RL2b, which is to be discharged from a light discharge surface 36b after it is reflected on a reflection type polarization element 32b and undergoes total reflection on a light incident surface 34b, can be effectively discharged from the light discharge surface 36b. Referring to FIG. 3B, the return light splitting prism 31b is designed to have the basic angle α' such that the return light RL2b, which is reflected on the reflection type polarization element 32b and undergoes total reflection on the light incident surface 34b to be discharged from the light discharge surface 36b, goes incident perpendicularly on the light discharge surface 36b, so that it is discharged by passing through the light discharge surface 36b.

In this case, however, with the polarization member 30b, a light such that follows the optical path of the return light RL3, which is reflected on the reflection type polarization element 32b and undergoes total reflection on the light incident surface 34b to go incident on the light discharge surface 36b after it is reflected again on the reflection type polarization element 32b, readily undergoes total reflection on the light discharge surface 36b. This raises the need to impose the limitation, for example, by prohibiting the use of a region within the light incident surface 34b, on which region the modulation light ML3, that is, the generation source of the return light RL3, goes incident. When the light incident region is limited in this manner, the prism needs to be thicker. In addition, in the case of the return light splitting prism 31b, the manufacturing is complicated due to the absence of a perpendicular portion.

Referring to FIG. 4, $\theta_3$ and $\theta_4$ of the graph indicate Condition (1)' and Condition (2)', respectively, on the assumption that the modulation lights ML go incident on the light incident surface 34a with a width of angles with respect to the normal to the light incident surface 34a. In this case, too, conditions that have to be taken into account vary on the boundary at which the refractive index takes 1.415.

The modulation lights ML from the liquid crystal panel 25 have been described on the assumption that they are basically perpendicular to the light incident surfaces 34, 34a, and 34b. A case where the modulation lights ML have a width of angles with respect to the normal to the light incident surface 34, 34a, and 34b will now be described more concretely.

Figure 5:
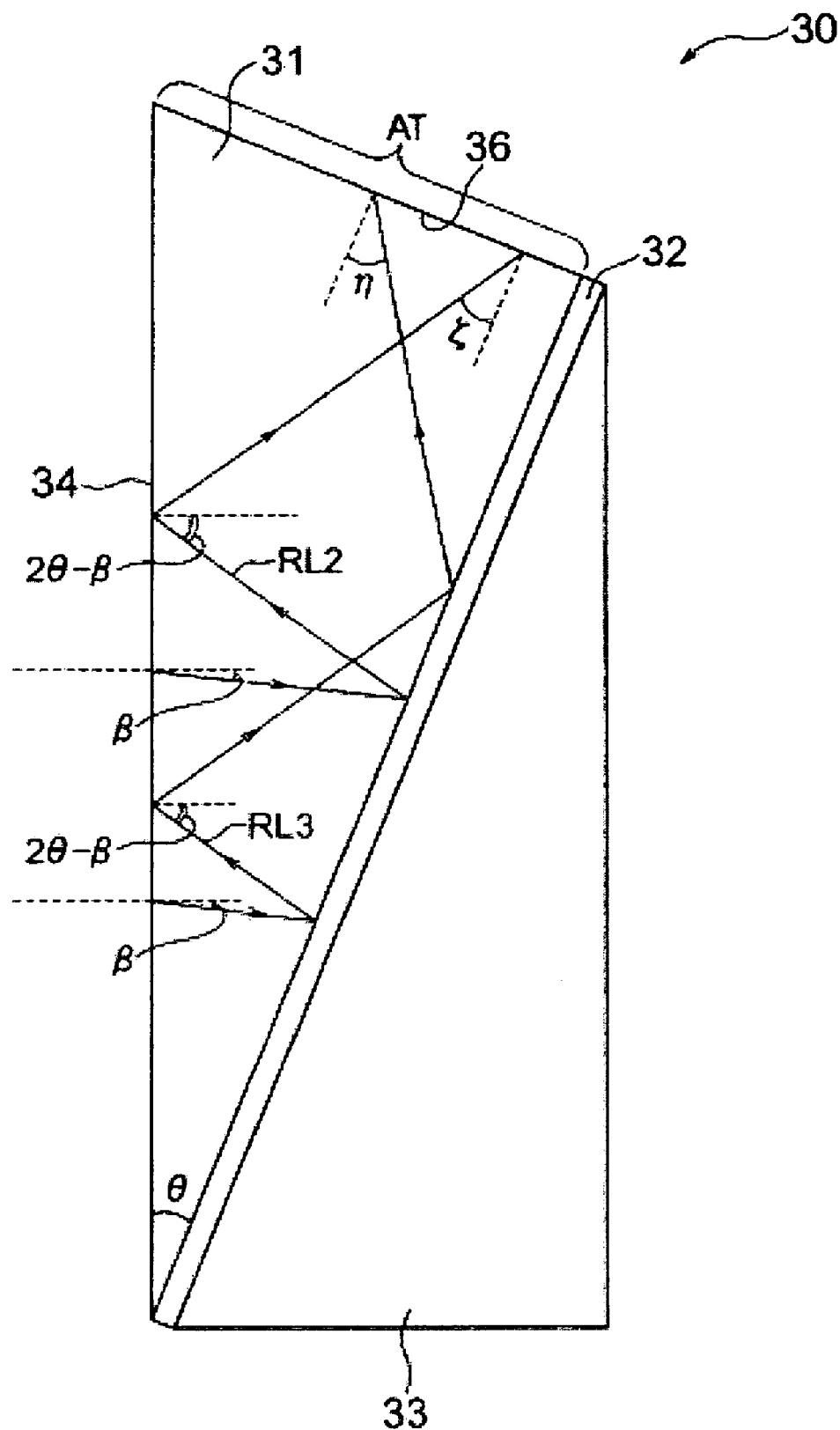
FIG. 5 is a view used to describe a case where a modulation light has a width of angles.

FIG. 5 is a view used to describe optical paths inside the polarization member 30 when the modulation lights ML2 and ML3 have a width of angles with respect to the normal to the light incident surface 34 in this exemplary embodiment. In this case, the modulation lights ML having a width of angles with respect to the normal to the light incident surface 34 go incident on the return light splitting prism 31 from the light incident surface 34 and are then refracted. Given an angle of refraction, β, as an angle of refraction with respect to the light incident surface 34, then, as with the case of going incident perpendicularly on the light incident surface 34, the modulation lights ML2 and ML3 follow the optical paths of the return lights RL2 and RL3, respectively. In this case, the return light RL2 is reflected twice and the return light RL3 is reflected three times (including total reflection) in total, after which they pass through and exit from the light transmission region AT of the light discharge surface 36. In this instance, both the return lights RL2 and RL3 reflected on the reflection type polarization element 32 have the angle of incidence of 2θ−β with respect to the light incident surface 34. Hence, in this case, the condition for allowing the total reflection on the light incident surface 34 is as follows:

$$\theta \geq \frac{1}{2}\sin^{-1}\frac{1}{n} + \frac{\beta}{2} \quad (3)$$

In addition, the condition for prohibiting the total reflection on the light discharge surface 36 is as follows:

$$\xi \leq \sin^{-1}\frac{1}{n}$$

$$\eta \leq \sin^{-1}\frac{1}{n}$$

where ξ and η are angles of incident. Herein, ξ=(180°−α)−3θ+β, and η=α−3θ+β are given. Further, because α=90° is given, we obtain ξ=η=90°−3θ+β. Hence, the condition that the return light splitting prism 31 needs to satisfy to prohibit both the return lights RL2 and RL3 from undergoing total reflection on the light discharge surface 36 takes the same value as the inequality as follows:

$$\theta \geq 30° - \frac{1}{3}\sin^{-1}\frac{1}{n} + \frac{\beta}{3} \quad (4)$$

Under the condition where these Conditions (3) and (4) are satisfied, both the return lights RL2 and RL3 are discharged without returning to the liquid crystal panel 25 and processed further. In addition, as can be understood from the conditional expressions of the angles of incidence, ξ and η, as in the case where the modulation lights ML go incident perpendicularly on the light incident surface 34 as described above, when the basic angle α is set to an angle other than 90°, one of the angles of incidence is lessened while the other angle of incidence is increased. When the angle of incidence is increased, a light undergoes total reflection more readily. The optimum condition is therefore to set the basic angle α to 90°, and in a practical use, it is preferable to set the basic angle α to 90° or almost 90°. In comparison with Conditions (1) and (2) described above, each of the conditions is more restrict because of the last term in the right side including the angle of refraction, β.

Referring to FIG. 5, a width of angles of the modulation lights ML is given as a tilt in one of the directions with respect to the normal to the light incident surface 34, that is, downward in the drawing. However, the same description applies when a width of angles is given as the tilt from the other direction with respect to the normal to the light incident surface 34, for example, upward in the drawing. The width of angles in a practice use is ±15°, which determines the angle of refraction, β, to be about 8°.

The projector 50 of the first exemplary embodiment is of a so-called single-panel type. A second exemplary embodiment will describe a case where a light reflection type polarization member 30 is used in a three-panel type projector.

Figure 6:
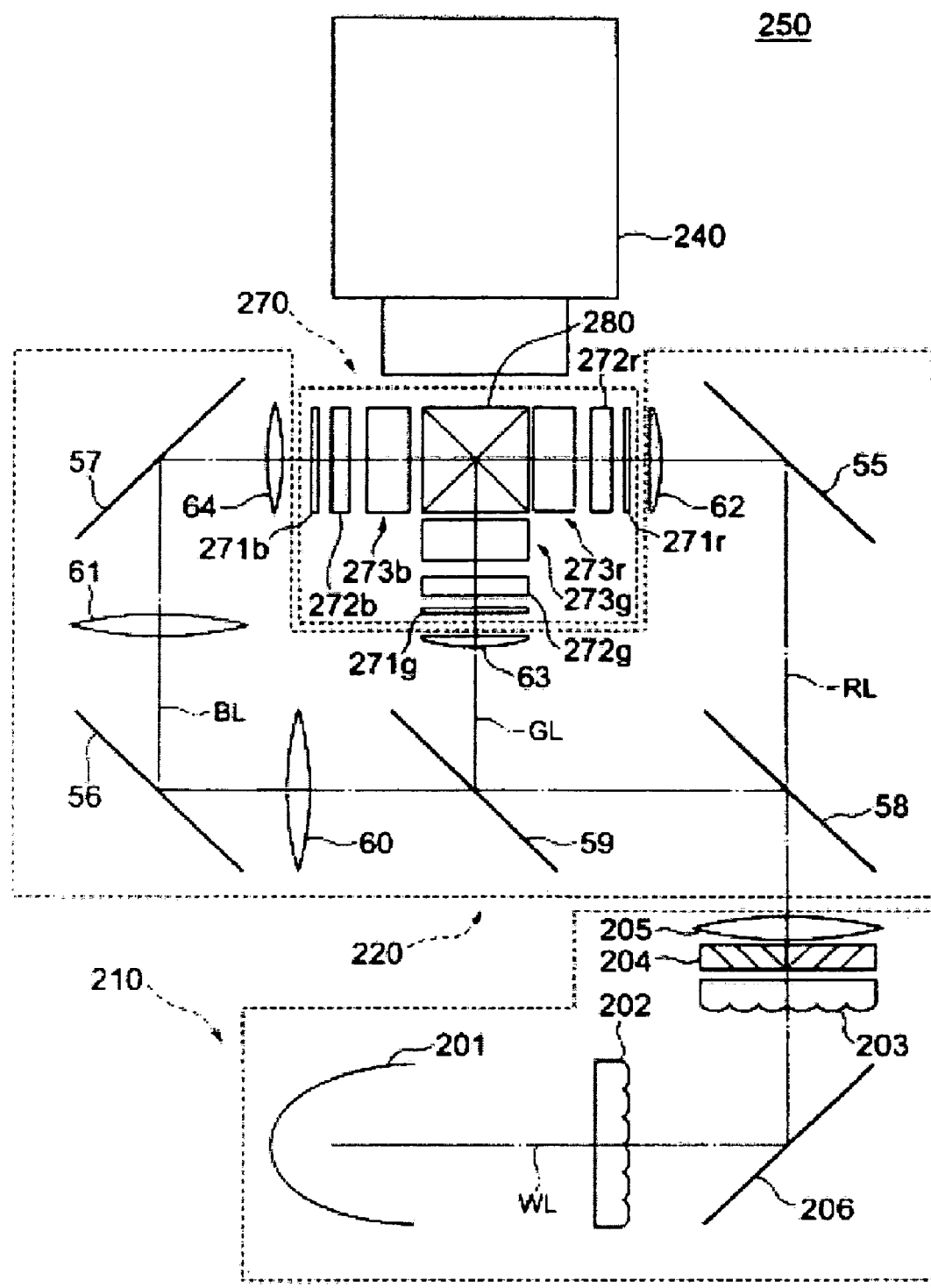
FIG. 6 is a view used to describe the projector according to the second exemplary embodiment.

FIG. 6 is a view used to describe the configuration of a projector 250 according to this exemplary embodiment. The projector 250 can include an illumination device 210 that forms illumination lights SL, a color separation system 220 that separates each illumination light SL into color lights of specific wavelengths, a projection light forming system 270 provided with light modulation devices that form image lights of respective colors and a light combining system that forms a combined light by combining the image lights, and a projection lens 240 serving as a projection system that projects the combined light thus formed onto a screen or the like in the form of a projection light at a desired scale of enlargement. Optical elements forming the illumination device 210, the color separation system 220, the projection light forming system 270, and the projection lens 240 are positioned in reference to a specific illumination optical axis.

The illumination device 210 can include a light source 201, lens arrays 202 and 203, a polarization conversion element array 204, a superimposing lens 205, and a mirror 206. The light source device 201 generates light source lights WL, and the lens arrays 202 and 203 and the superimposing lens 205 make a quantity of light across the light cross section homogeneous in the image forming region of each of liquid crystal panels 272r, 272g, and 272b provided to the projection light forming system 270 described below. The mirror 206 changes the optical paths of the light source lights WL.

The color separation system 220 can include mirrors 55, 56, and 57, dichroic mirrors 58 and 59, relay lenses 60 and 61, and field lenses 62, 63, and 64. The dichroic mirrors 58 and 59 are formed by coating a dielectric multi-layer film on a light transmissive substrate, such as a glass substrate.

The projection light forming system 270 includes polarizers 271r, 271g, 271b that increase the degree of polarization of respective color lights separated in the color separation system 220, liquid crystal panels 272r, 272g, and 272b of respective colors serving as light modulation devices that modulate respective color lights emitted from the polarizers 271r, 271g, and 271b to form modulation lights, polarization members 273r, 273g, and 273b that form image lights using the modulation lights modulated in the respective liquid crystal panels 272r, 272g, and 272b, and a cross dichroic prism 280 serving as a light combining system that forms a combined light by combining the image lights of respective colors. The liquid crystal panels 272r, 272g, and 272b use, for example, polysilicon TFTs as the switching elements. Although it is not shown in the drawing, each liquid crystal panel can include a panel main body formed by hermetically sealing liquid crystal in a space between a pair of oppositely placed light transmissive substrates and a holding frame accommodating the panel main body. The cross dichroic prism 280 can include a dielectric multi-layer film that reflects a red light and a dielectric multi-layer film that reflects a blue light provided almost in the shape of a capital X along the boundaries of four rectangular prisms. Lights of three colors are combined by these dielectric multi-layer films. Each of the polarization members 273r, 273g, and 273b includes a return light splitting prism, a reflection type polarization element, and an optical path adjustment prism. Because each functions in the same manner as the counterpart of the first exemplary embodiment, illustrations in the drawing and the descriptions of these components are omitted.

The projection lens 240 can include a set lens comprising plural lenses accommodated in a cylindrical case.

The function of the projector 250 will now be described by following the image forming steps. Referring to FIG. 6, the light source lights WL from the light source 201 first pass through the lens array 202. The light source lights WL are then reflected on the mirror 206, and pass through the lens array 203, the polarization conversion element array 204, and the superimposing lens 205. The lens arrays 202 and 203 and the superimposing lens 205 function to make a quantity of the light source lights WL across the light cross section homogeneous in the image forming regions of the liquid crystal panels 272r, 272g, and 272b provided to the projection light forming system 270 described below. All the lights included in the light source lights WL are forced to change their directions when reflected on the mirror 206. The illumination lights SL are thus formed using the light source lights WL, and go incident on the color separation system 220. The light source device 201, the lens array 202 and 203, the polarization conversion element array 204, and the superimposing lens 205 of the illumination device 210 are, respectively, of the same configurations as the light source 1, the lens arrays 2 and 3, the polarization conversion element array 4, and the superimposing lens 5 of the illumination device 10 of the first exemplary embodiment. Detailed descriptions of these components are therefore omitted herein.

Each illumination light SL coming incident on the color separation system 220 is separated into a red color RL and a light including a blue color BL and a green color GL by the dielectric multi-layer film of the first dichroic mirror 58.

Further, the light including the green light GL and the blue light BL is separated into the green light GL and the blue light BL by the second dichroic mirror 59. The second dichroic mirror 59 has such a characteristic that it reflects the green light GL and transmits the blue light BL.

The illumination light SL can be divided into the red light RL, the green light GL, and the blue light BL of specific wavelengths due to the functions of the dichroic mirrors 58 and 59 as described above.

The red light RL having passed through the dichroic mirror 58 is reflected on the reflection mirror 55, and goes incident on the polarizer 271r and the liquid crystal panel 272r for red by passing through the field lens 62 serving as a light collecting element. The field lens 62 converts respective partial lights exiting from the lens array 203 to lights almost parallel to the illumination optical axis. The same description applies to the field lenses 63 and 64 provided on the light incident side of the other liquid crystal panels 272g and 272b, respectively.

The green light GL reflected on the dichroic mirror 59 goes incident on the polarizer 271g and the liquid crystal panel 272g for green by passing through the field lens 63.

Meanwhile, the blue light BL having passed through the dichroic mirror 59 goes incident on the polarizer 271b and the liquid crystal panel 272b for blue by passing through the relay lenses 60 and 61 and further the field lens 64.

The relay lenses 60 and 61 and the reflection mirrors 56 and 57 together form the relay optical system, which is furnished with a function of guiding the blue light BL, which is a color light separated by the dichroic mirrors 58 and 59, to the liquid crystal panel 271b.

In this exemplary embodiment, the length of the optical path of the blue light BL from the dichroic mirror 58 to the polarizer 271b on which the blue light BL goes incident is longer than the length of the optical path of the green light GL from the dichroic mirror 58 to the polarizer 271g on which the green light GL goes incident and the length of the optical path of the red light RL from the dichroic mirror 58 to the polarizer 271r on which the red light RL goes incident. The reason why the relay system is used for a blue light is because the length of the optical path of the blue light BL is longer than the lengths of the optical paths of the other color lights, and the blue light BL needs to be corrected to prevent deterioration of efficiency for utilization of light resulted from light diffusion or the like. That is, the relay lenses 60 and 61 are provided in the optical path of the blue light to enable such a correction. In short, the purpose is to transmit the light coming incident on the relay lens 60 intact to the field lens 64.

The respective color lights separated in the color separation system 220 are modulated according to image information to form an optical image by means of three liquid crystal panels 272r, 272g, and 272b, the polarizers 271r, 271g, and 271b, and the polarization members 273r, 273g, and 273b.

For the respective color lights RL, GL, and BL that go incident, respectively, on the polarizers 271r, 271g, and 271b, the polarization direction is limited to a narrower range as the polarizers 271r, 271g, and 271b transmit the linearly polarized lights in a specific direction to be modulated in the liquid crystal panels 272r, 272g, and 272b and absorb lights other than the linearly polarized lights in the specific direction. The respective color lights RL, GL, and BL therefore go incident on the liquid crystal panels 272r, 272g, and 272b at a higher degree of polarization. The liquid crystal panels 272r, 272g, and 272b modulate, respectively, the color lights RL, GL, and BL, according to the image information to form modulation lights ML. As with the first exemplary embodiment, of the modulation lights ML thus formed, the linearly polarization component in the specific direction, which is a necessary light, is emitted to the cross dichroic prism 280 from each of the polarization members 273r, 273g, and 273b. On the other hand, the polarization components, which are unwanted lights, are discharged to the outside of the optical paths. The direction of the linearly polarized lights allowed to pass through the polarizers 271r, 271g, and 271b, and the direction of the linearly polarized lights allowed to pass through the polarization members 273r, 273g, and 273b are set to be orthogonal to each other.

Further, image lights formed for the respective colors are combined in the cross dichroic prism 280, and the image lights from the respective liquid crystal panels 272r, 272g, and 272b combined in the cross dichroic prism 280 is then projected onto the screen or the like from the projection lens 240 for a color combined image to be displayed on the screen at a desired scale of enlargement.

Because the projector 250 of this exemplary embodiment uses the light reflection type polarization element, the life is extended in comparison with a case where light absorption type polarization elements are used.

In this exemplary embodiment, the polarization members 273r, 273g, and 273b each provided with the reflection type polarization element are disposed at the latter stage of the optical paths of the liquid crystal panels 272r, 272g, and 272b. However, the polarization members using the reflection type polarization elements can be disposed at the former stage of the light modulation devices. In this case, the polarizers 271r, 271g, and 271b are replaced by reflection type polarization members having the same mechanisms as the polarization members 273r, 273g, and 273b. By limiting the polarization direction to a narrower range as in the same manner as the polarizers 271r, 271g, and 271b due to the transmission and reflection characteristics of polarization of these reflection type polarization members, not only is it possible to enhance the degree of polarization, but it is also possible to improve the durability.

In this exemplary embodiment, the polarization members 273r, 273g, and 273b each provided with the reflection type polarization element are used on the optical paths of all the color lights. However, any of the polarization members 273r, 273g, and 273b for the corresponding optical path may be replaced with a light absorption type polarization element as needed, provided that no problem occurs as to the life or the like. For example, it may be configured in such a manner that the polarization member 273b is used for the optical path of the blue light BL alone, and the polarization members 273r and 273g on the optical paths of the other colors are replaced with light absorption type polarization elements.

Figure 7:
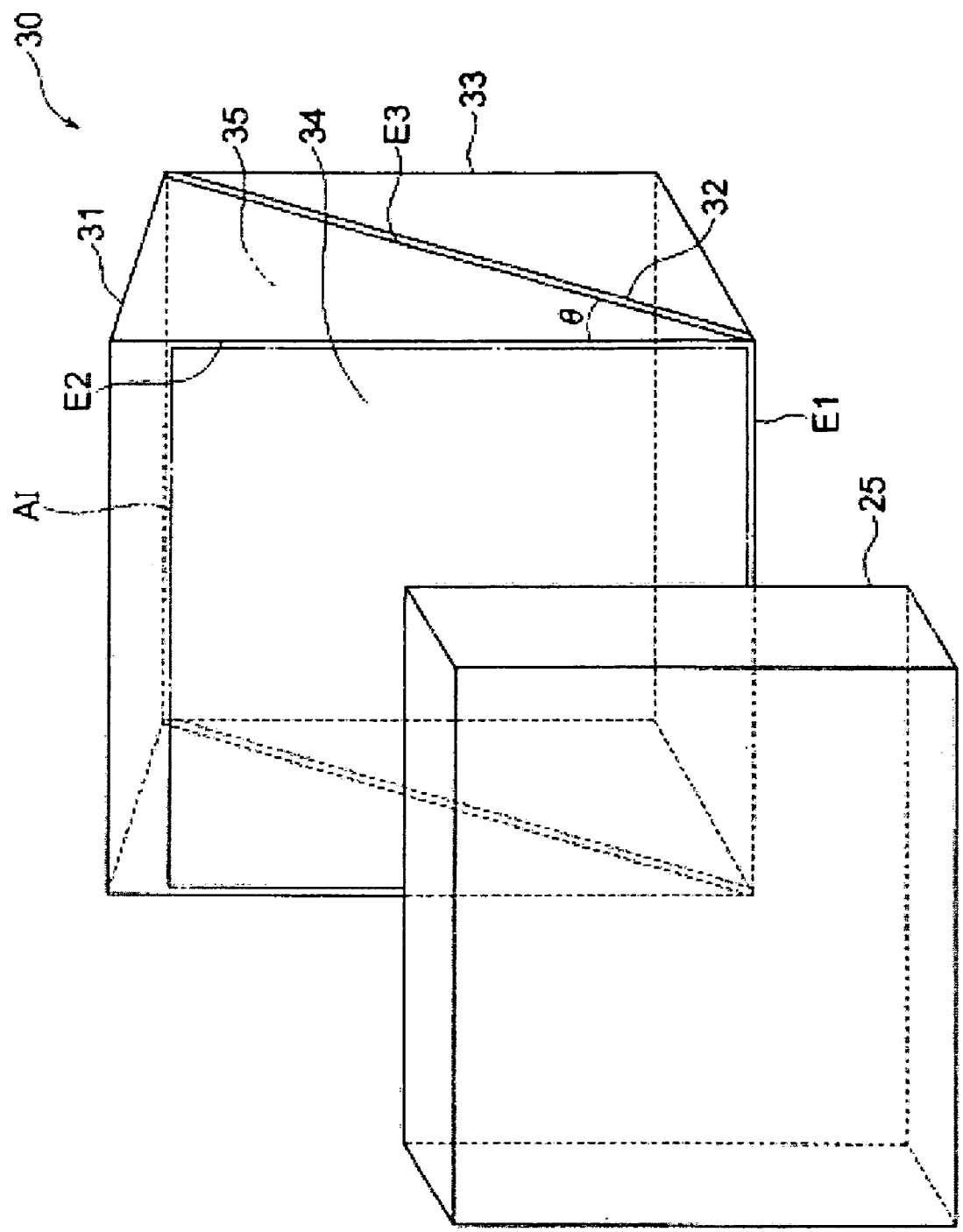
FIG. 7 is a perspective view showing a polarization member.

FIG. 7 is a perspective view schematically showing a liquid crystal panel 25 and a polarization member 30 in a third exemplary embodiment. In this case, the liquid crystal panel 25 is of a horizontal rectangular shape, and the modulation lights ML formed by the liquid crystal panel 25 are therefore also of a horizontal rectangular shape. In addition, both the light incident surface 34 and the light exiting surface 35 of the return light splitting prism 31 of the polarization member 30 are of a rectangular shape, and a light incident region AI is formed within the light incident surface 34 in a shape matching with the shape of the modulation lights ML.

The apex angle θ is set in directions between short sides E2 and E3 of the horizontal rectangles. More specifically, the return light splitting prism 31 is formed in such a manner that an angle produced between the light incident surface 34 and the light exiting surface 35 is equal to the apex angle θ on the assumption that one long side E1 of the rectangular light incident surface 34 is the ridge between the light incident surface 34 and the rectangular light exiting surface 35. Hence, given that the apex angle θ is the same, then a thinner return light splitting prism 31 can be manufactured in a case where the return light splitting prism 31 is formed in such a manner that the ridge abutting on both the light incident surface 34 and the light exiting surface 35 is provided on the long side of the rectangle than in a case where the return light splitting prism 31 is formed in such a manner that the angle produced between the light incident surface 34 and the light exiting surface 35 is equal to the apex angle θ on the assumption that one of the short sides (for example, the short side E2) of the light incident surface 34 is the ridge that abuts on the rectangular light exiting surface 35.

Figure 8:
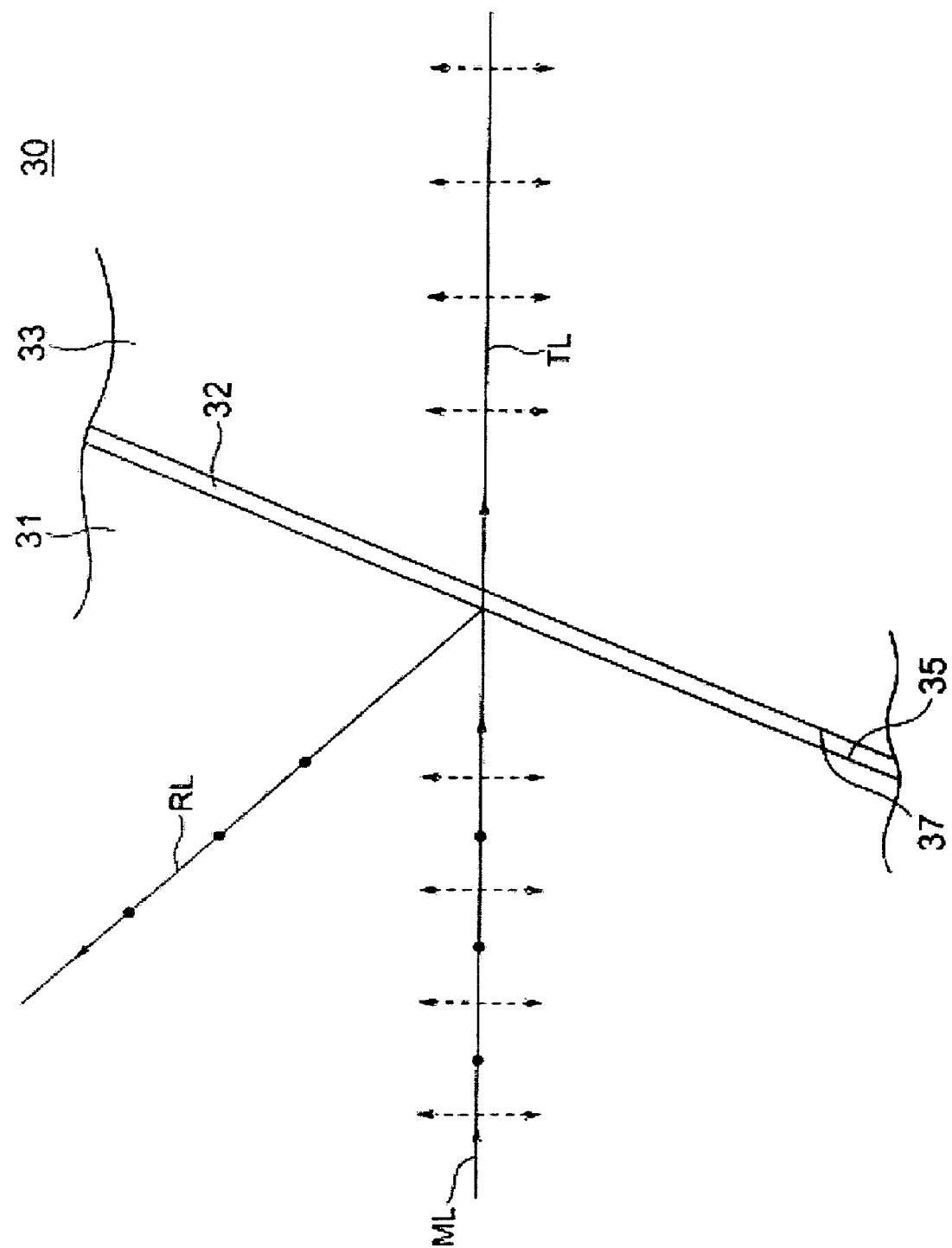
FIG. 8 is a view used to describe polarization components that are reflected on and pass through a reflection type optical element.

FIG. 8 is a view used to describe the polarization components of the modulation lights ML that are reflected on and pass through the reflection type polarization element 32. Respective polarization components included in the modulation lights ML and having different polarization directions are indicated by dotted arrows and dots. Generally, the light exiting surface 35 of the return light splitting prism 31 and the light incident surface 37 of the optical path adjustment prism 33 readily transmit linear polarization components (dotted arrows) in a direction crossing these surfaces corresponding to their tilting directions, whereas they readily reflect the linear polarization components (dots) in a direction parallel to the surfaces. In addition, the reflection type polarization element 32 has a property that the transmission and reflection characteristics with respect to respective polarization components in the incident light differ with a pattern direction of the fine structure. Hence, by setting those having the polarization direction indicated by the dots to be the return light RL and those having the polarization direction indicated by the dotted arrows to be the transmission light TL, and setting the pattern direction of the fine structure provided in the reflection type polarization element 32 to be consistent with the settings described above, it is possible to allow the transmission light TL, which is a necessary light, to pass through the reflection type polarization element 32 more effectively, which can in turn enhance the contrast.

FIG. 9 is a view used to describe a polarization member 330 provided with a return light splitting prism 331 in a fourth exemplary embodiment, which is a modified return light splitting prisms of the exemplary embodiments above. Hereinafter, the shape of the return light splitting prism 331 of this exemplary embodiment will be described. Like numerical references are labeled to like components with respect to the first exemplary embodiment, and detailed descriptions of such components are omitted or given briefly.

The return light splitting prism 331 is different from the return light splitting prism 31 comprising a triangular prism having three surfaces including the light incident surface, the light discharge surface, and the light exiting surface in that a ridge portion (a portion indicated by a dotted line in the drawing) to be formed by the light discharge surface and the light exiting surface is, for example, chamfered. As with the return light splitting prism 31, the angle produced between the light discharge surface and the light exiting surface is a right angle. The surface formed newly by chamfering is referred to as a total reflection surface 339. The total reflection surface 339 is parallel to the light incident surface 344. The light exiting surface 335 left as a result of chamfering and an unillustrated reflection type polarization element are designed to have shapes that match with each other as in the first exemplary embodiment.

When the return light splitting prism 331 is of the shape as above, for example, the light transmission region AT' used to discharge the return light RL1 and the light incident region AI can be isolated. This configuration enables the control of the optical path of the reflected light, for example, the return light RL1, which is an unwanted light, can be guided farther from the unillustrated liquid crystal panel. Also, since the total reflection surface 339 is chamfered in parallel to the light incident surface 334, the return light splitting prism 331 remains almost as thin as the return light splitting prism 31. The respective return lights RL are discharged from the light transmission region AT' of the light incident surface 334 and the light transmission region surface AT of the light discharge surface 336, and processed so that they go incident on the absorber or in any other appropriate manner. The return light RL that goes incident on the total reflection surface 339 undergoes total reflection in accordance with Condition (1). However, because the optical path after the total reflection is parallel to the return light RL1, both the return lights are handled in the same manner.

FIG. 10A and FIG. 10B are views used to describe an optical path adjustment prism of a fifth exemplary embodiment in which the optical path adjustment prisms in the exemplary embodiments above are modified. Hereinafter, the shape of the optical path adjustment prism of this embedment will be described. Like numerical references are labeled to like components with respect to the first exemplary embodiment, and detailed descriptions of such components are omitted or given briefly.

FIG. 10A shows a polarization member 330a provided with the return light splitting prism 31 and the reflection type polarization element 32 of the first exemplary embodiment and an optical path adjustment prism 333a of this exemplary embodiment.

The optical path adjustment prism 333a of the polarization member 330a is the same as the return light splitting prism 31. Hence, the kinds of components are lessened, which is advantageous in the case of mass production.

FIG. 10B shows a polarization member 330b provided with the return light splitting prism 31 and the reflection type polarization element 32 of the first exemplary embodiment and an optical path adjustment prism 333b of this exemplary embodiment.

The optical path adjustment prism 333b of the polarization member 330b is a rectangular prism having a position adjustment surface 340, which is a surface that can form the same plane as the light incident surface 34 of the return light splitting prism 31. Hence, when the return light splitting prism 31 and the optical path adjustment prism 333b are combined via the reflection type polarization element 32, it is easy to position the return light splitting prism 31 and the optical path adjustment prism 333b with each other. Further, because the position adjustment surface 340 of the optical path adjustment prism 333b is parallel to the light exiting surface 338b, the optical path adjustment prism 333b having the bottom surface 341 perpendicular to both the position adjustment surface 340 and the light exiting surface 338b can be readily positioned and fixed when the polarization member 330b is incorporated into a projector or the like.

It should be appreciated that the invention is not limited to the exemplary embodiments above, and modifications and improvements within the scope to achieve the advantage of the invention are therefore included in the invention.

In the exemplary embodiments above, a blue light is allowed to travel through the relay system, and the length of the optical path of the blue light is set longer than the lengths of the optical paths of the other color lights. However, the invention is not limited to this configuration, and a red light may be allowed to travel through the relay system.

The exemplary embodiments above have described only the case of using a front type projector that projects lights in a direction in which the viewers view the screen. However, the invention is also applicable to a rear type projector that projects light in a direction opposite from a direction in which the viewers view the screen.

Further, while this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention. The priority applications Numbers JP2004-281116 upon which this patent application is based is hereby incorporated by reference.

What is claimed is:

1. A polarization member, comprising:
a reflection type polarization element that transmits a linear polarization component of an incident light in a specific direction and reflects components other than the linear polarization component in the specific direction;
a return light splitting prism having a light incident surface on which the incident light is incident, a light exiting surface disposed at a specific tilting angle with respect to the light incident surface, and a light discharge surface from which a return light that is reflected on the reflection type polarization element provided to the light exiting surface enters inside by way of the light exiting surface is discharged in a direction that crosses neither an optical path of the incident light that goes incident on the light incident surface nor an optical path of a light that has passed through the reflection type polarization element; and
the light discharge surface including a light transmission region surface on which, of return lights entering inside by way of the light exiting surface, lights that have been reflected a different numbers of times on one of the light incident surface and the light reflection type polarization element or on both go incident at almost a same angle of incidence in opposite tilting directions to pass through.

2. The polarization member according to claim 1, further comprising:
an optical path adjustment prism disposed at a latter stage of an optical path of the reflection type polarization element that adjusts all lights having passed through the reflection type polarization element to have equal optical path lengths in the polarization member.

3. The polarization member according to claim 1,
the light transmission region surface of the light discharge surface of the return light splitting prism being perpendicular to the light exiting surface.

4. The polarization member according to claim 1,
reflection of the return light on the light incident surface being total reflection.

5. The polarization member according to claim 1,
the return light splitting prism having a refractive index of 1.415 or higher.

6. The polarization member according to claim 1,
the reflection type polarization element being disposed to be parallel to the light exiting surface.

7. The polarization member according to claim 1,
both of the light incident surface and the light exiting surface of the return light splitting prism being of rectangular shapes, and the specific tilting angle being set between short side directions of rectangles.

8. The polarization member according to claim 1,
the reflection type polarization element selectively transmitting a polarization component having transmissivity that increases relatively with a tilting direction of the light exiting surface.

9. The polarization member according to claim 1,
the return light splitting prism being provided with a total reflection surface formed by chamfering a ridge portion formed by the light discharge surface and the light exiting surface in the form of a plane parallel to the light incident surface.

10. A projector, comprising:
an illumination device that emits an illumination light;
a light modulation device that modulates the illumination light from the illumination device;
a polarization member, disposed at a latter stage of the light modulation device, that emits an image light by transmitting only a linearly polarized light in a specific direction of the modulation light modulated in the light modulation device; and
a projection system that projects the image light formed in the light modulation device and the polarization member,
the polarization member being the polarization member according to claim 1.

11. The projector according to claim 10,
the polarization member further comprising:
an optical path adjustment prism disposed at a latter stage of an optical path of the reflection type polarization element that adjusts all lights having passed through the reflection type polarization element to have equal optical path lengths in the polarization member.

12. The projector according to claim 10,
in the polarization member, the light transmission region surface of the light discharge surface of the return light splitting prism being perpendicular to the light exiting surface.

13. The projector according to claim 10,
in the polarization member, reflection of the return light on the light incident surface being total reflection.

14. The projector according to claim 10,
in the polarization member, the return light splitting prism having a refractive index of 1.415 or higher.

15. The projector according to claim 10,
in the polarization member, the reflection type polarization element being disposed to be parallel to the light exiting surface.

16. The projector according to claim 10,
in the polarization member, both of the light incident surface and the light exiting surface of the return light splitting prism being of rectangular shapes, and the specific tilting angle being set between short side directions of rectangles.

17. The projector according to claim 10,
in the polarization member, the reflection type polarization element selectively transmitting a polarization component having transmissivity that increases relatively with a tilting direction of the light exiting surface.

18. The projector according to claim 10,
in the polarization member, the return light splitting prism being provided with a total reflection surface formed by chamfering a ridge portion formed by the light discharge surface and the light exiting surface in the form of a plane parallel to the light incident surface.

19. A projector, comprising:
an illumination device that emits an illumination light;
a light modulation device that modulates the illumination light from the illumination device;
a polarization element, disposed at a former stage of the light modulation device, that emits only a linearly polarized light in a specific direction to the light modulation device;
a polarization member, disposed at a latter stage of the light modulation device, that emits an image light by transmitting only a linearly polarized light of the modulation light modulated in the light modulation device in a direction orthogonal to the linearly polarized light in the specific direction;
a projection system that projects the image light formed in the polarization element, the light modulation device, and the polarization member; and
the polarization element being the polarization member according to claim 1.

20. The projector according to claim 19,
the polarization member as the polarization element disposed at a former stage of the light modulation device further comprising:
an optical path adjustment prism disposed at a latter stage of an optical path of the reflection type polarization element that adjusts all lights having passed through the reflection type polarization element to have equal optical path lengths in the polarization member.

21. The projector according to claim 19,
in the polarization member as the polarization element disposed at a former stage of the light modulation device, the light transmission region surface of the light discharge surface of the return light splitting prism being perpendicular to the light exiting surface.

22. The projector according to claim 19,
in the polarization member as the polarization element disposed at a former stage of the light modulation device, reflection of the return light on the light incident surface being total reflection.

23. The projector according to claim 19,
in the polarization member as the polarization element disposed at a former stage of the light modulation device, the return light splitting prism having a refractive index of 1.415 or higher.

24. The projector according to claim 19,
in the polarization member as the polarization element disposed at a former stage of the light modulation device, the reflection type polarization element being disposed to be parallel to the light exiting surface.

25. The projector according to claim 19,
in the polarization member as the polarization element disposed at a former stage of the light modulation device, both of the light incident surface and the light exiting surface of the return light splitting prism being of rectangular shapes, and the specific tilting angle being set between short side directions of rectangles.

26. The projector according to claim 19,
in the polarization member as the polarization element disposed at a former stage of the light modulation device, the reflection type polarization element selectively transmitting a polarization component having transmissivity that increases relatively with a tilting direction of the light exiting surface.

27. The projector according to claim 19,
in the polarization member as the polarization element disposed at a former stage of the light modulation device, the return light splitting prism being provided with a total reflection surface formed by chamfering a ridge portion formed by the light discharge surface and the light exiting surface in the form of a plane parallel to the light incident surface.

28. A projector, comprising:
an illumination device that emits an illumination light;
a color separation system that separates the illumination light into color lights of specific wavelengths;
plural light modulation devices that modulate respective color lights separated in the color separation system;
plural polarization members, disposed, respectively, at a latter stage of optical paths of the plural light modulation devices, that emit image lights by transmitting only linearly polarized lights in a specific direction of the modulation lights modulated in the plural light modulation devices;
a light combining system that combines the image lights of the respective colors formed in the plural light modulation devices and the plural polarization members;
a projection system that projects the image lights combined in the light combining system; and
at least one of the plural polarization members being the polarization member according to claim 1.

29. The projector according to claim 28,
the polarization member further comprising:
an optical path adjustment prism disposed at a latter stage of an optical path of the reflection type polarization element that adjusts all lights having passed through the reflection type polarization element to have equal optical path lengths in the polarization member.

30. The projector according to claim 28,
in the polarization member, the light transmission region surface of the light discharge surface of the return light splitting prism being perpendicular to the light exiting surface.

31. The projector according to claim 28,
in the polarization member, reflection of the return light on the light incident surface being total reflection.

32. The projector according to claim 28,
in the polarization member, the return light splitting prism having a refractive index of 1.415 or higher.

33. The projector according to claim 28,
in the polarization member, the reflection type polarization element being disposed to be parallel to the light exiting surface.

34. The projector according to claim 28,
in the polarization member, both of the light incident surface and the light exiting surface of the return light splitting prism being of rectangular shapes, and the specific tilting angle being set between short side directions of rectangles.

35. The projector according to claim 28, in the polarization member, the reflection type polarization element selectively transmitting a polarization component having transmissivity that increases relatively with a tilting direction of the light exiting surface.

36. The projector according to claim 28, in the polarization member, the return light splitting prism being provided with a total reflection surface formed by chamfering a ridge portion formed by the light discharge surface and the light exiting surface in the form of a plane parallel to the light incident surface.

37. A projector, comprising:

an illumination device that emits an illumination light;

a color separation system that separates the illumination light into color lights of specific wavelengths;

plural light modulation devices that modulate respective color lights separated in the color separation system;

plural polarization elements, disposed, respectively, at a former stage of optical paths of the plural light modulation devices, that emit only linearly polarized lights in a specific direction to the plural light modulation devices;

plural polarization members, disposed, respectively, at a latter stage of the optical paths of the plural light modulation devices, that emit image lights by transmitting, of the modulation lights modulated in the plural light modulation devices, only linearly polarized lights in a direction orthogonal to the linearly polarized lights in the specific direction;

a light combining system that combines image lights of respective colors formed in the plural light modulation devices and the plural polarization members;

a projection system that projects the image lights combined in the light combining system; and at least one of the plural polarization elements being the polarization member according to claim 1.

38. The projector according to claim 37, the polarization member as the polarization element disposed at a former stage of the light modulation device further comprising:

an optical path adjustment prism disposed at a latter stage of an optical path of the reflection type polarization element that adjusts all lights having passed through the reflection type polarization element to have equal optical path lengths in the polarization member.

39. The projector according to claim 37, in the polarization member as the polarization element disposed at a former stage of the light modulation device, the light transmission region surface of the light discharge surface of the return light splitting prism being perpendicular to the light exiting surface.

40. The projector according to claim 37, in the polarization member as the polarization element disposed at a former stage of the light modulation device, reflection of the return light on the light incident surface being total reflection.

41. The projector according to claim 37, in the polarization member as the polarization element disposed at a former stage of the light modulation device, the return light splitting prism having a refractive index of 1.415 or higher.

42. The projector according to claim 37, in the polarization member as the polarization element disposed at a former stage of the light modulation device, the reflection type polarization element being disposed to be parallel to the light exiting surface.

43. The projector according to claim 37, in the polarization member as the polarization element disposed at a former stage of the light modulation device, both of the light incident surface and the light exiting surface of the return light splitting prism being of rectangular shapes, and the specific tilting angle being set between short side directions of rectangles.

44. The projector according to claim 37, in the polarization member as the polarization element disposed at a former stage of the light modulation device, the reflection type polarization element selectively transmitting a polarization component having transmissivity that increases relatively with a tilting direction of the light exiting surface.

45. The projector according to claim 37, in the polarization member as the polarization element disposed at a former stage of the light modulation device, the return light splitting prism being provided with a total reflection surface formed by chamfering a ridge portion formed by the light discharge surface and the light exiting surface in the form of a plane parallel to the light incident surface.

* * * * *